US008868078B2

(12) United States Patent
Molloy et al.

(10) Patent No.: US 8,868,078 B2
(45) Date of Patent: Oct. 21, 2014

(54) SELECTING BETWEEN RADIO ACCESS TECHNOLOGIES

(71) Applicant: Nvidia Corporation, Santa Clara, CA (US)

(72) Inventors: Steve Molloy, Cambridge (GB); Stephen A. Allpress, Bristol (GB); Mathieu Imbault, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 57 days.

(21) Appl. No.: 13/721,656

(22) Filed: Dec. 20, 2012

(65) Prior Publication Data

US 2013/0310036 A1    Nov. 21, 2013

(30) Foreign Application Priority Data

May 15, 2012    (GB) .................................. 1208528.8

(51) Int. Cl.
*H04W 36/14* (2009.01)
*H04W 36/30* (2009.01)
*H04W 36/24* (2009.01)
*H04W 36/36* (2009.01)

(52) U.S. Cl.
CPC ............... *H04W 36/14* (2013.01); *H04W 36/30* (2013.01); *H04W 36/24* (2013.01); *H04W 36/36* (2013.01)
USPC ........... 455/436; 455/437; 455/443; 455/444; 455/449; 455/452.2

(58) Field of Classification Search
CPC ..... H04W 36/14; H04W 36/24; H04W 36/34; H04W 36/36; H04W 36/30
USPC .............. 455/436, 437, 443, 444, 449, 452.2, 455/456.1
See application file for complete search history.

(56) References Cited

U.S. PATENT DOCUMENTS

2008/0311912 A1* 12/2008 Balasubramanian et al. 455/436
2009/0209256 A1*  8/2009 Nakashima et al. .......... 455/436

(Continued)

FOREIGN PATENT DOCUMENTS

GB    2475094 A    5/2011
GB    2490989 A    11/2012

(Continued)

OTHER PUBLICATIONS

Foreign Communication from related counter part application, Great Britain Application No. GB1208528.8, Great Britain Search and Examination Report dated Nov. 14, 2013, 7 pages.

*Primary Examiner* — Khai M Nguyen

(57) ABSTRACT

A mobile terminal comprising: transceiver apparatus for accessing a wireless network using an earlier and a later generation radio access technology, to establish a voice channel and packet data channel; and an inter radio access technology selector configured to monitor a condition for disabling the earlier generation access, being a condition other than coverage under the earlier generation technology falling below an acceptable lower level. The selector makes inter radio access technology decisions dynamically from the mobile terminal by updating registration with the network to indicate that the earlier generation technology is no longer supported. The selector thereby prevents the mobile terminal being subject to decisions from the network that would otherwise impose transfer to the earlier generation. At least some of the decisions made from the mobile terminal thus disable the earlier generation access whilst in presence of at least the lower level of coverage under the earlier generation.

22 Claims, 2 Drawing Sheets

(56) References Cited

U.S. PATENT DOCUMENTS

| | | | |
|---|---|---|---|
| 2010/0075665 A1* | 3/2010 | Nader et al. | 455/426.1 |
| 2010/0124931 A1* | 5/2010 | Eskicioglu et al. | 455/440 |
| 2010/0240367 A1* | 9/2010 | Lee et al. | 455/435.2 |
| 2011/0039579 A1* | 2/2011 | Karjalainen | 455/456.1 |
| 2011/0176436 A1* | 7/2011 | Swaminathan et al. | 370/252 |
| 2013/0064176 A1* | 3/2013 | Hsu et al. | 370/328 |

FOREIGN PATENT DOCUMENTS

| | | |
|---|---|---|
| WO | 2008050958 A1 | 5/2008 |
| WO | 2008157449 A1 | 12/2008 |
| WO | 2009153390 A1 | 12/2009 |
| WO | 2011068557 A1 | 6/2011 |

* cited by examiner

SELECTING BETWEEN RADIO ACCESS TECHNOLOGIES

CROSS REFERENCES TO RELATED APPLICATION

This application claims priority from GB Application No. 1208528.8 filed on May 15, 2012, entitled "Selecting Between Radio Access Technologies," by Steve Molloy, et al. The above application is commonly assigned with this application and is incorporated herein by reference in its entirety.

TECHNICAL FIELD

The disclosure relates to selecting between radio access technologies in a wireless communication network.

BACKGROUND

A device such as a smartphone, tablet or other mobile terminal may be capable of supporting multiple radio access technologies for communicating over a wireless cellular network. For example the device may support both 2G and 3G technologies; or 2G, 3G and LTE (Long Term Evolution) technologies. A radio access technology (or "RAT") is a manifestation in a device and/or network of a particular set of standardised specifications, comprising standardised protocols for communicating over the network. For example 2G, 3G and LTE technologies are defined in the various releases of the 3GPP ($3^{rd}$ Generation Partnership Project) standard. Each of the radio access technologies can be used for both voice over a dedicated voice channel and data over a general purpose packet-based data channel.

In a 3GPP environment, the radio access technology used by the device at any given time is subject to precise rules specified in the standard. Criteria have to be applied for inter-RAT selection, and these criteria are controlled by the network. A control element of the network such as a radio network controller (RNC) makes inter-RAT decisions on behalf of the device based on the criteria as evaluated at the network control element according to the strict rules specified in the standard (even if based on measurements submitted on by the device on the uplink). Commands which impose the inter-RAT decisions on the mobile device in question are then sent on a control channel on the downlink from the network.

Typically, the modem of the mobile terminal itself can also take the decision to change RAT but only when radio quality under the current RAT falls below a certain acceptable threshold level. I.e. the mobile can change to another RAT if the current RAT there is effectively no longer suitable coverage under the current RAT for the connection to work properly, but in all other circumstances such decisions are imposed by the network

SUMMARY

According to one aspect of the disclosure, there is provided a mobile terminal. In one embodiment, the mobile terminal includes: transceiver apparatus operable to access a wireless network using an earlier generation radio access technology and a later generation radio access technology, for establishing a voice channel and packet data channel; and an inter radio access technology selector configured to monitor a condition for disabling the access using the earlier generation radio access technology, being a condition other than coverage under the earlier generation radio access technology falling below an acceptable lower level; the selector being configured to make inter radio access technology decisions dynamically from the mobile terminal by, in response to detecting said condition, updating registration with the network to indicate that the earlier generation radio access technology is no longer supported so as to prevent the mobile terminal being subject to inter radio access technology decisions from the network that would otherwise impose transfer to the earlier generation radio access technology; at least some of the inter radio access technology decisions made from the mobile terminal thereby disabling the access using the earlier generation radio access technology whilst in presence of at least said lower level of coverage under the earlier generation radio access technology.

According to another aspect of the disclosure, there is provided a method of operating a mobile terminal. In one embodiment, the method includes: using an earlier generation radio access technology and a later generation radio access technology to communicate between the mobile terminal and a wireless network, via a voice channel and packet data channel; at the mobile terminal, monitoring a condition for disabling the access using the earlier generation radio access technology, being a condition other than coverage under the earlier generation radio access technology falling below an acceptable lower level; and making inter radio access technology decisions dynamically from the mobile terminal by, in response to detecting said condition, signalling from the mobile terminal to update registration with the network to indicate that the earlier generation radio access technology is no longer supported, so as to prevent the mobile terminal being subject to inter radio access technology decisions from the network that would otherwise impose transfer to the earlier generation radio access technology; at least some of the inter radio access technology decisions made from the mobile terminal thereby disabling the access using the earlier generation radio access technology whilst in presence of at least said lower level of coverage under the earlier generation radio access technology.

According to another aspect of the disclosure, there is provided a computer program product. In one embodiment, the computer program product code includes code embodied on a non-transitory computer-readable medium and configured so as when executed on a processing apparatus of a mobile terminal to perform operations in accordance with any of the above method or apparatus features.

BRIEF DESCRIPTION OF THE DRAWINGS

For a better understanding of the disclosure and to show how it may be put into effect, reference is made by way of example to the accompanying drawings in which.

DETAILED DESCRIPTION

Figure 1:
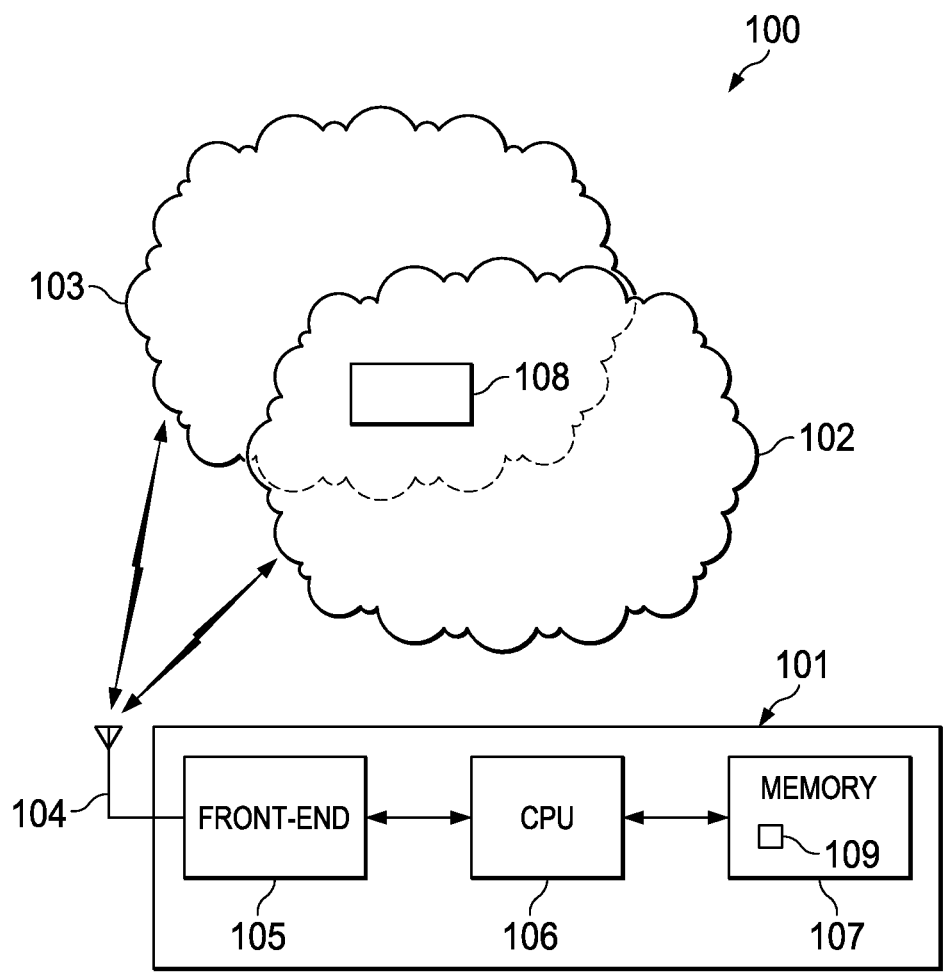
FIG. 1 is a schematic diagram of a communication network.

However, a problem occurs when the device is transferring data (as opposed to making voice call) with a certain throughput but is then suddenly transferred to 2G access technology by a command from the network. Often in this scenario the end user will be left with the impression that data transfer has simply stopped working, or at least stopped working properly, having dropped from several mega-bits per second to less than 100 kilo-bits per second.

The user could be given the option to set his or her device into a mode in which 2G is disabled. However, completely disabling 2G support may cause coverage issues when 3G or LTE radio conditions become very weak—the user could miss voice calls or even become out of service in certain areas. Also, an end user would typically not want to switch 2G support on and off manually. Aside from the inconvenience, he or she will not necessarily be in possession of relevant information like the exact signal level available and the statistics of the recent radio coverage or data activity.

Embodiments disclosed herein provide a solution to this problem by automatically enabling and disabling support of 2G when one or more particular criteria are met, despite the mobile terminal still being in presence of a certain minimum level of coverage under the 2G (or more generally earlier generation) network. In order to stay compliant with 3GPP standard the device performs a registration update with the network to indicate that the device is no longer 2G capable and vice versa when support of 2G is re-enabled. In this way the mobile device can autonomously prevent itself from being subject to inter-RAT decisions switching to the 2G technology when that might not be desirable from the individual perspective of the device, but can also re-enable the option of 2G access when that might still be useful to the device.

A similar issue may be addressed by other embodiments in relation to any different radio access technologies.

In embodiments, the mobile terminal may comprise a user interface operable to select between modes of the mobile terminal: a mode in which the access using the earlier generation radio access technology is manually set to enabled by the user, a mode in which the access using the earlier generation radio access technology is manually set to disabled by the user, and an automatic mode in which the access using the earlier generation radio access technology is disabled dynamically according to said inter radio access technology decisions made by the selector.

In embodiments, the condition for disabling the access using the earlier generation radio access technology may comprise one or more of the disablement criteria: there being more than a threshold of activity on the packet data channel, there being more than a threshold of coverage of the later generation radio access technology, and there being lack of activity on the voice channel.

In embodiments, the condition for disabling the access using the earlier generation radio access technology may comprise any one of said disablement criteria being met.

In embodiments, the condition for disabling the access using the earlier generation radio access technology may comprise a combination of two or more of said disablement criteria being met.

In embodiments, the condition for disabling the access using the earlier generation radio access technology may comprise one or more of said disablement criteria being met for more than a respective time period.

In embodiments, the selector may be configured, in response to detecting a condition for re-enabling the earlier generation radio access technology, to update registration with the network to indicate that the earlier generation radio access technology is supported again.

In embodiments, the condition for re-enabling the earlier generation radio access technology may comprise one or more of the re-enablement criteria: there being less than a threshold of activity on the packet data channel, there being less than a threshold of coverage of the later generation radio access technology, and there being a request for use of the voice channel.

In embodiments, the condition for re-enabling the access using the earlier generation radio access technology may comprise any one of said re-enablement criteria being met.

In embodiments, the condition for re-enabling the access using the earlier generation radio access technology may comprise a combination of two or more of said re-enablement criteria being met.

In embodiments, the condition for re-enabling the access using the earlier generation radio access technology may comprise one or more of said re-enablement criteria being met for more than a respective time period.

In embodiments, the disabling may comprise disabling the transceiver apparatus from scanning for coverage of the earlier generation radio access technology.

In embodiments, the earlier generation radio access technology may comprise 2G. The later generation radio access technology may comprise one of 3G and LTE.

In embodiments, the method disclosed herein may comprise further operations corresponding to any of the above device features.

Turning now to the figures, FIG. 1 shows a communication system comprising a wireless network in the form of a mobile cellular network 100 such as a 3GPP network, and a device in the form of a mobile terminal 101. The mobile terminal may for example take the form of a smartphone or other mobile phone, or a tablet or laptop computer.

The mobile network 100 comprises a part 102 operating according to an earlier generation radio access technology, e.g. 2G, and a part 103 operating according to a later generation radio access technology, e.g. 3G or LTE. Each of the 2G part 102 and 3G part 103 of the network comprises a plurality of base stations (not shown explicitly), sometimes also referred to as Node-Bs in 3G or LTE terminology. Note that the 2G and 3G parts of the network 102 and 103 typically overlap geographically and share some of the same base stations in terms of the physical units, though logically the 2G and 3G parts of the network 102 and 103 may be consider to provide separate cells, and furthermore the coverage will tend not to be 100% coincident at any one time. The 2G part 102 will tend to cover some geographical regions that overlap with the 3G part 103 and some that do not, and the geographical coverage of the two parts 102,103 and the degree of overlap will tend to vary over time. Further, even where the coverage is geographically coincident or overlapping, the levels of coverage (i.e. the signal strength that is obtainable by a mobile device at the location in question) may well differ between the two technologies 102 and 103, and also again these relative levels may vary over time.

The network 100 also comprises a control element 108 such as a radio network controller (RNC) coupled to both the earlier generation, e.g. 2G, part 102 of the network and the later generation, e.g. 3G or LTE, part 103 of the network.

The mobile terminal 101 comprises an antenna 104, a radio frequency (RF) front-end 105, a processor 106 in the form of a central processing unit (CPU) having one or more cores, and storage in the form of one or more internal and/or externally-connected memories 107 comprising one or more storage media (e.g. electronic storage medium, sometimes referred to as "flash memory", or a magnetic storage medium such as a hard drive). The antenna 104 is coupled to the RF front-end 105, the RF front-end 105 is coupled in turn to the processor 106, and the processor 106 is coupled to the memory 107.

The memory 107 stores soft-modem code arranged to be executed on the processor 106. When executed on the processor 106, the modem code configures the RF-front end 105 and antenna 104 to operate as a transceiver for communicating wirelessly over the mobile network 100.

The modem code is configured such that the communication over the network 100 may be conducted using any selected one of a plurality of radio access technologies including at least an earlier generation radio access technology and a later generation radio access technology, e.g. using 2G access technology to access the 2G part 102 and the 3G part 103 of the network. The modem code is configured so as when executed to enable at least a general-purpose packet data channel to be established over the mobile network 101 using the later generation access technology, e.g. using the 3G access technology over the 3G part of the network 103; and to enable either or both of a general-purpose packet data channel and a dedicated voice channel to be established over the network 101 using the earlier generation access technology, e.g. using the 2G access technology over the 3G part of the network 102. Preferably the later generation access technology can also be used for voice.

The term "data" may be used herein (and elsewhere in the art) as short-hand for general purpose data conveyed in packet-based form, carrying any user content desired by the application in question, which is intended in contrast to the term "voice" which means dedicated voice sent over a dedicated voice channel. The dedicated voice channel may be circuit-switched. Note that voice can also be transmitted over the general purpose packet data channel, e.g. by means of VoIP (voice over internet protocol), but nonetheless the data channel is not dedicated to voice nor specially configured for that purpose. Typically the 3G access technology is more suited to higher data rates for data, whilst the 2G access technology is adequate for voice and capable of data if need be.

The modem code is also configured to establish at least one control channel with the network control element 108. The network control element 108 is configured to make inter-RAT decisions on behalf of the mobile terminal 101, and to pass down these decisions to the mobile 101 as inter-RAT commands on the control channel.

However, in some situations it would be desirable for the mobile terminal 101 to prevent such commands being imposed upon it from the network 100. Particularly, in some circumstances it may be desirable form the individual perspective of the mobile terminal 101 to avoid being subject to decisions imposing a switch from a later generation access technology to an earlier generation access technology, e.g. to avoid commands switching from 3G or LTE to 2G.

In accordance with embodiments disclosed herein, the soft-modem code comprises an inter-RAT selector 109 implemented on the mobile terminal 101. The inter-RAT selector 109 is configured, acting from the mobile terminal 101, to dynamically make its own inter-RAT decisions and based on these decisions to automatically enable and disable support of 2G when one or more particular criteria are met. The inert-RAT decisions made by the inter-RAT selector 109 are independent decisions made autonomously from the network 100, separately from the inter-RAT handover policy of the network 100 including any of its control elements 108 such as the RNC.

In order to stay compliant with the 3GPP standard, the inter-RAT selector 109 is arranged to implement the disabling by operating the device 101 to update its registration with the network 101 to indicate that the device is no longer 2G capable, and vice versa to implement the re-enabling by operating the device to reverse the registration update with the network when support of 2G is re-enabled. The signals to update registration are made on the control channel, e.g. signalled to the network control element 108. Once the mobile terminal 101 has signalled that it no longer supports the earlier generation part of the network, e.g. the 2G part of the network 102, the network control element 108 responsible for making (or attempting to make) inter-RAT decisions on behalf of the mobile terminal 101 will no longer see the earlier generation access technology, e.g. 2G, as an option for that mobile terminal 101 and will not send it commands switching to that technology. Hence the mobile terminal 101 is able to enact its own decisions in this respect by means of the dynamic, automatic registration update process described herein.

A condition for disabling 2G may comprise one or a combination of the following criteria:
- a minimum threshold level of 3G or LTE coverage is detected (optionally with the rider that level remains above the threshold for a predetermined time period, e.g. the last x minutes);
- data transfer has climbed above a certain threshold, in terms of data volume and/or throughput;
- no voice call has occurred for a predetermined time period, e.g. in the last x minutes; and/or
- no 2G coverage has been available for a predetermined time period, e.g. the last z minutes.

The data transfer criterion could potentially also be made conditional on remaining above the threshold for a predetermined time period.

Note that having no 2G coverage is different from having updated the registration for the mobile terminal to indicate it no longer supports the 2G radio access technology. The registration is a logical state negotiated with the network, whereas the coverage is a physical radio state.

Criteria for re-enabling 2G may be a combination of:
- 3G or LTE coverage level is detected to have fallen below a certain threshold;
- There is no high volume data transfer, i.e. transfer is below a certain threshold (optionally with the rider that the data transfer has been below the threshold for a predetermined time period, e.g. no high volume data transfer in the last w minutes); and/or
- a voice call has been requested.

The coverage level and voice call criteria could potentially also be made conditional on remaining for a predetermined time period.

The one or more criteria making up each condition are evaluated and acted upon by the inter-RAT selector 109 so as to make inter-RAT decisions from the mobile terminal itself. The inter-RAT decisions are made dynamically by the inter-RAT selector 109, that is to say on the fly in response to real-time changes detected during ongoing monitoring of the one or more criteria, as and when the relevant condition is detected.

Note that one or more of the above criteria may result in the 2G access being disabled despite the mobile terminal 101 being substantially in presence of the 2G part of the network 102, i.e. in presence of an operative amount of coverage under the 2G radio access technology (or more generally the earlier generation radio access technology). This is because the motive for disabling is not the lack of availability of 2G, but rather the availability of 2G and therefore the possibility of being switched to 2G access by the network when the mobile terminal 101 would prefer use of the 3G access technology.

Disabling 2G may also save some battery consumption in terms of inter-RAT measurements and CPU resources. To this end, the inter-RAT selector 109 may be arranged such that the disabling of 2G also comprises ceasing to scan for availability of 2G coverage, and vice versa starting scanning again when 2G is re-enabled.

However, updating registration to disable 2G and then re-attaching to the 2G network has a cost in terms of User Plane Stop, 3GPP signalling and battery consumption. Therefore choosing the right moment and right conditions to apply the switch is desirable to achieve the best effect. In some embodiments, this is achieved by applying a condition based on a combination of two or more of the above criteria for disabling 2G, and also a condition based on a combination of two or more of the above criteria for re-enabling 2G.

Where criteria are combined to form a condition, the condition may be that any one of the constituent criteria are met, or that two or more of the constituent criteria are met together. Other forms of condition are also possible, e.g. that 2G is disabled if a function of coverage level, data traffic and voice activity crosses a predetermined threshold.

Figure 2:
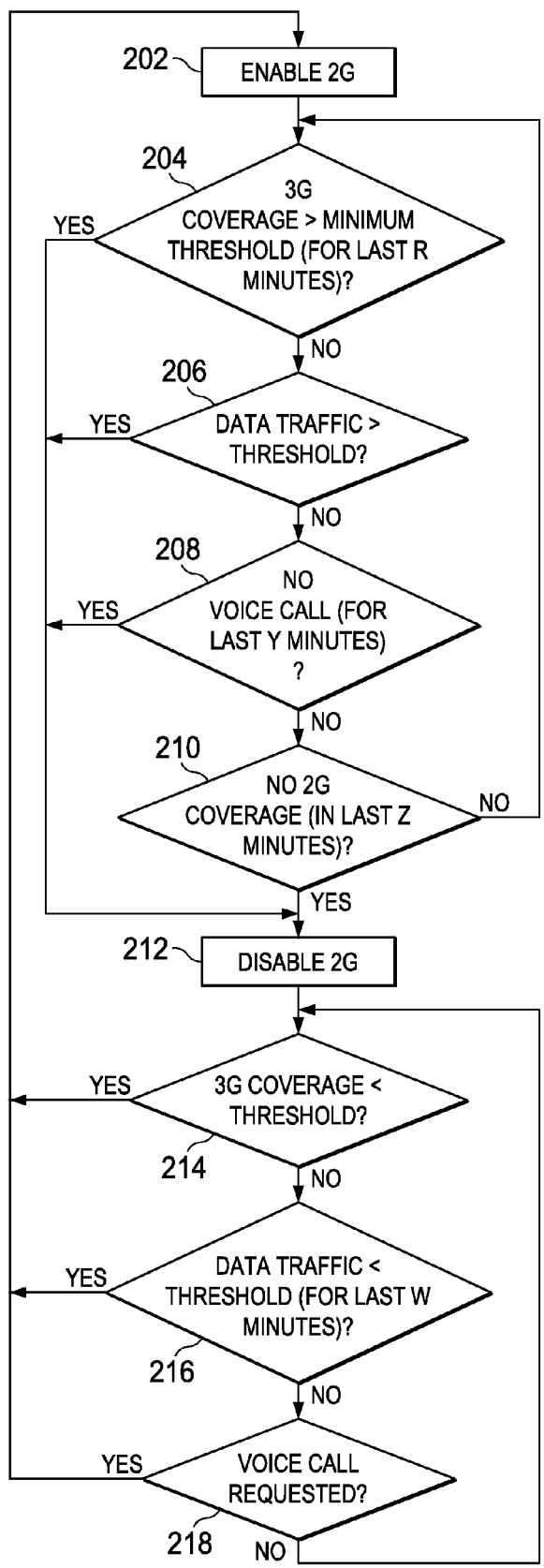
FIG. 2 is a flow chart of a method for disabling a radio access technology.

A process based on a combination of all these criteria is exemplified in the flow chart of FIG. 2. The method begins at step 202 with 2G enabled and continues by monitoring the criteria of: whether the 3G coverage level is above a certain threshold (step 204), whether data transfer traffic is above a certain threshold (step 206), whether there has been no voice call for a certain time (step 208), and/or whether there is not enough 2G coverage (step 210). If one or a combination of these criteria is met, the method branches to step 212 where 2G is disabled. Otherwise the method continues to monitor the criteria. When 2G is disabled the method continues by monitoring the criteria of: whether the 3G coverage level has fallen below a certain threshold (step 214), whether data transfer traffic is below a certain threshold (step 216), and whether a voice call has been requested by the user of the mobile terminal 101 or an incoming call (step 218). If one or a combination of these criteria is met, the method branches back to step 202 where the 2G access is re-enabled. Otherwise the method continues to monitor the criteria.

In particularly embodiments, the feature of dynamic, automatic 2G enabling and disabling may be mapped onto a configuration item setting in the user interface of the device so that the user may turn the setting on and off depending on the data centric or voice centric usage of the device. The setting could be accessible at the same place in the interface as "2G enabled", "3G enabled" and/or "LTE enabled" settings, and could be called "2G Dynamic" or the like. The 2G enabled, 3G enabled and/or LTE enabled settings are used to set the 2G access, 3G access and/or LTE access on manually, permanently until the setting is changed. The dynamic 2G setting on the other hand sets the inter-RAT selector 109 to automatically and dynamically enable and disable the 2G access in accordance with embodiments, e.g. based on one of the embodiments exemplified above.

It will be appreciated that the above embodiments have been described only by way of example. Other variants may become apparent to a person skilled in the art given the disclosure herein.

For instance, although the above has been described in terms of a 2G access technology and a 3G access technology, the disclosure can also apply for use in relation to any two or more radio access technologies, e.g. where basic 3G is the earlier generation technology (an earlier 3GPP release) and an LTE technology is the later generation technology (a later 3GPP release); or even where an LTE technology is the earlier generation technology and a future release is the later generation technology.

Further, note that the above criteria for disabling and enabling the earlier generation RAT are not exhaustive. Other criteria could also be applied based on the principle of disabling the earlier generation access technology not because coverage under that technology has fallen below a certain workable level, but rather because of the nature of the current activity of the mobile terminal or desired activity of the mobile terminal is such that it would prefer from its own perspective to use the later generation and not to be subject to inter-RAT decisions to the contrary from the network.

Further, although the above has been described in terms of a substantially soft modem implementation, other implementations where more or even all of the described functions are implemented in dedicated hardware are not excluded.

The disclosure is not limited by the described embodiments but only by the accompanying claims.

The invention claimed is:

1. A mobile terminal comprising:
transceiver apparatus operable to access a wireless network using an earlier generation radio access technology and a later generation radio access technology, for establishing a voice channel and packet data channel; and
an inter radio access technology selector configured to monitor a condition for disabling the access using the earlier generation radio access technology, being a condition other than coverage under the earlier generation radio access technology falling below an acceptable lower level;
the selector being configured to make inter radio access technology decisions dynamically from the mobile terminal by, in response to detecting said condition, updating registration with the network to indicate that the earlier generation radio access technology is no longer supported so as to prevent the mobile terminal being subject to inter radio access technology decisions from the network that would otherwise impose transfer to the earlier generation radio access technology;
at least some of the inter radio access technology decisions made from the mobile terminal thereby disabling the access using the earlier generation radio access technology whilst in presence of at least said lower level of coverage under the earlier generation radio access technology.

2. The mobile terminal of claim 1, comprising a user interface operable to select between modes of the mobile terminal: a mode in which the access using the earlier generation radio access technology is manually set to enabled by the user, a mode in which the access using the earlier generation radio access technology is manually set to disabled by the user, and an automatic mode in which the access using the earlier generation radio access technology is disabled dynamically according to said inter radio access technology decisions made by the selector.

3. The mobile terminal of claim 1, wherein the condition for disabling the access using the earlier generation radio access technology comprises one or more of the disablement criteria: there being more than a threshold of activity on the packet data channel, there being more than a threshold of coverage of the later generation radio access technology, and there being lack of activity on the voice channel.

4. The mobile terminal of claim 3, wherein the condition for disabling the access using the earlier generation radio access technology comprises any one of said disablement criteria being met.

5. The mobile terminal of claim 3, wherein the condition for disabling the access using the earlier generation radio access technology comprises a combination of two or more of said disablement criteria being met.

6. The mobile terminal of claim 1, wherein the condition for disabling the access using the earlier generation radio access technology comprises the criterion of the there being lack of activity on the voice channel.

7. The mobile terminal of claim 1, wherein the condition for disabling the access using the earlier generation radio access technology comprises the criterion of there being more than a threshold of activity on the packet data channel.

8. The mobile terminal of claim 1, wherein the condition for disabling the access using the earlier generation radio access technology comprises the criterion of there being more than a threshold of coverage under the later generation radio access technology.

9. The mobile terminal of claim 3, wherein the condition for disabling the access using the earlier generation radio access technology comprises one or more of said disablement criteria being met for more than a respective time period.

10. The mobile terminal of claim 1, wherein the selector is configured, in response to detecting a condition for re-enabling the earlier generation radio access technology, to update registration with the network to indicate that the earlier generation radio access technology is supported again.

11. The mobile terminal of claim 10, wherein the condition for re-enabling the earlier generation radio access technology comprises one or more of the re-enablement criteria: there being less than a threshold of activity on the packet data channel, there being less than a threshold of coverage of the later generation radio access technology, and there being a request for use of the voice channel.

12. The mobile terminal of claim 11, wherein the condition for re-enabling the access using the earlier generation radio access technology comprises any one of said re-enablement criteria being met.

13. The mobile terminal of claim 11, wherein the condition for re-enabling the access using the earlier generation radio access technology comprises a combination of two or more of said re-enablement criteria being met.

14. The mobile terminal of claim 11, wherein the condition for re-enabling the access using the earlier generation radio access technology comprises the criterion of there being a request for use of the voice channel.

15. The mobile terminal of claim 11, wherein the condition for re-enabling the access using the earlier generation radio access technology comprises the criterion of there being less than a threshold of activity on the packet data channel.

16. The mobile terminal of claim 11, wherein the condition for re-enabling the access using the earlier generation radio access technology comprises the criterion of less than a threshold of coverage of the later generation radio access technology.

17. The mobile terminal of claim 11, wherein the condition for re-enabling the access using the earlier generation radio access technology comprises one or more of said re-enablement criteria being met for more than a respective time period.

18. The mobile terminal of claim 1, wherein the disabling comprises disabling the transceiver apparatus from scanning for coverage of the earlier generation radio access technology.

19. The mobile terminal of claim 1, wherein the earlier generation radio access technology comprises 2G.

20. The mobile terminal of claim 1, wherein the later generation radio access technology comprises one of 3G and LTE.

21. A method of operating a mobile terminal, comprising:
using an earlier generation radio access technology and a later generation radio access technology to communicate between the mobile terminal and a wireless network, via a voice channel and packet data channel;
at the mobile terminal, monitoring a condition for disabling the access using the earlier generation radio access technology, being a condition other than coverage under the earlier generation radio access technology falling below an acceptable lower level; and
making inter radio access technology decisions dynamically from the mobile terminal by, in response to detecting said condition, signaling from the mobile terminal to update registration with the network to indicate that the earlier generation radio access technology is no longer supported, so as to prevent the mobile terminal being subject to inter radio access technology decisions from the network that would otherwise impose transfer to the earlier generation radio access technology;
at least some of the inter radio access technology decisions made from the mobile terminal thereby disabling the access using the earlier generation radio access technology whilst in presence of at least said lower level of coverage under the earlier generation radio access technology.

22. A computer program product comprising code embodied on a non- transitory computer-readable medium that is configured to direct the operation of a processor of a mobile terminal when initiated thereby, to perform operations of:
using an earlier generation radio access technology and a later generation radio access technology to communicate between the mobile terminal and a wireless network, via a voice channel and packet data channel;
at the mobile terminal, monitoring a condition for disabling the access using the earlier generation radio access technology, being a condition other than coverage under the earlier generation radio access technology falling below an acceptable lower level; and
making inter radio access technology decisions dynamically from the mobile terminal by, in response to detecting said condition, signaling from the mobile terminal to update registration with the network to indicate that the earlier generation radio access technology is no longer supported, so as to prevent the mobile terminal being subject to inter radio access technology decisions from the network that would otherwise impose transfer to the earlier generation radio access technology;
at least some of the inter radio access technology decisions made from the mobile terminal thereby disabling the access using the earlier generation radio access technology whilst in presence of at least said lower level of coverage under the earlier generation radio access technology.

* * * * *